LOUISA KEHM.
COMBINED SCOOPS AND SIEVES.
No. 180,349. Patented July 25, 1876.
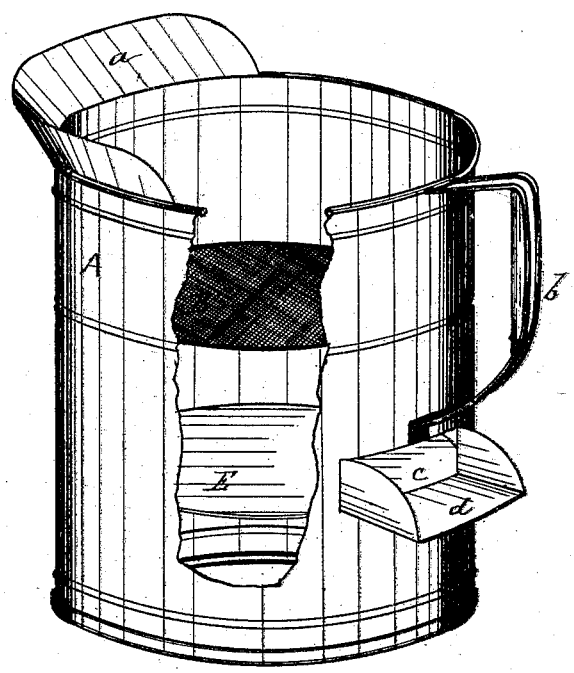
Witnesses.
Inventor.
Louisa Kehm
by her attys.
A. H. Evans & Co.
Washington D. C.

UNITED STATES PATENT OFFICE.

LOUISA KEHM, OF URBANA, ILLINOIS.

IMPROVEMENT IN COMBINED SCOOPS AND SIEVES.

Specification forming part of Letters Patent No. 180,349, dated July 25, 1876; application filed June 26, 1876.

*To all whom it may concern:*

Be it known that I, LOUISA KEHM, of Urbana, Illinois, have invented certain Improvements in Scoop-Sieves; and I hereby declare the following to be a full, clear, and exact description thereof, reference being had to the accompanying drawings, making a part of this specification, in which—

Figure 1 is a perspective view, with a portion of the side broken away to show the internal construction.

The object of my invention is to produce a sieve that will not be liable to soil the table or other object upon which it may be placed; and it consists in providing the inclosing-cylinder of the sieve with a solid diaphragm, and a side opening below the meshes of the sieve, as hereinafter more fully set forth and claimed.

In the said drawings, A is a cylinder, provided with a scoop-shaped projection, $a$, a handle, $b$, and an opening, $c$, provided with a lip or apron, $d$. Within this cylinder A, and above the opening $c$, I place a wire-cloth sieve, B, which may be made removable, if desired. I also construct within the cylinder, and flush with the lower edge of the opening $c$ and apron $d$, a solid diaphragm or bottom, E.

The operation of my device is as follows:

When any material is sifted through B it falls upon diaphragm E, and is poured out through the opening $c$; and when the utensil is placed upon any object all soiling is avoided, as the diaphragm E receives any remaining material that may be jarred from the meshes of the wire-cloth.

When jellies have been passed through a sieve, it is a source of trouble and annoyance to properly dispose of the sieve without soiling the table, or whatever object on which the sieve may be placed before being cleaned.

My invention avoids this difficulty, as the continued dripping from the sieve will be caught by the diaphragm or bottom, and the sieve may set down anywhere without danger of soiling anything.

Having thus described my invention, what I claim as new, and desire to secure by Letters Patent, is—

As a new article of manufacture, a sieve, consisting of the cylinder A, provided with the side opening $c$, gauze diaphragm B, and solid diaphragm E, as described.

LOUISA KEHM.

Witnesses:
E. H. CUSHMAN,
FRED. REIMUND.